United States Patent [19]

Wiebe et al.

[11] Patent Number: 4,627,314

[45] Date of Patent: Dec. 9, 1986

[54] STRIPPING DEVICE, PARTICULARLY FOR CONDUCTORS WITH TOUGH INSULATION

[75] Inventors: Ulrich Wiebe, Dörentrup; Manfred Wilmes, Detmold, both of Fed. Rep. of Germany

[73] Assignee: C.A. Weidmuller GmbH & Co., Detmold, Fed. Rep. of Germany

[21] Appl. No.: 664,613

[22] Filed: Oct. 25, 1984

[30] Foreign Application Priority Data

Nov. 9, 1983 [SE] Sweden ................................ 8306163

[51] Int. Cl.⁴ ............................................. H02G 1/12
[52] U.S. Cl. ................................................. 81/9.43
[58] Field of Search ................................ 81/9.4–9.44, 81/9.51; 30/90.1, 90.2, 91.2

[56] References Cited

U.S. PATENT DOCUMENTS

| | | | |
|---|---|---|---|
| 2,407,233 | 9/1946 | Greer et al. | 81/9.4 X |
| 3,089,367 | 5/1963 | Schulter | 81/9.4 |
| 3,403,441 | 10/1968 | Eubanks | 81/9.5 X |
| 3,915,037 | 10/1975 | Wiener | |
| 4,197,768 | 4/1980 | Undin | |
| 4,395,928 | 8/1983 | Undin et al. | |
| 4,407,174 | 10/1983 | Schulze | 81/9.42 |

FOREIGN PATENT DOCUMENTS 3134311 12/1983 Fed. Rep. of Germany.
1577947 10/1980 United Kingdom.

Primary Examiner—Frederick R. Schmidt
Assistant Examiner—Debra S. Meislin
Attorney, Agent, or Firm—Karl F. Ross; Herbert Dubno

[57] ABSTRACT

The stripping device comprises a pair of jaws of which each is provided with a cutting knife. For secure positioning of an inserted conductor, and in order to strip off a severed portion of its insulation layer, a resilient positioning element with a tapering recess is provided adjacent one cutting knife. The positioning element grasps and guides the conductor already when the cutting edge of the cutting knife begins to penetrate into the insulation layer, and yields thereupon resiliently without releasing the conductor. Said cutting edge is preferably provided with a semicircular recess which may be produced by a plurality of blanks fixed in a sloping position being worked by a metal removing tool having at the periphery the profile shape of said recess.

13 Claims, 8 Drawing Figures

STRIPPING DEVICE, PARTICULARLY FOR CONDUCTORS WITH TOUGH INSULATION

FIELD OF THE INVENTION

The invention relates to a stripping device for insulated electrical conductors.

BACKGROUND OF THE INVENTION

It is already known (U.S. Pat. No. 2,133,005) to give the cutting edge of a stripping knife an approximately semicircular shape in order that an insulation layer of a conductor having circular cross-section may be surrounded to the greatest possible extent and cut through by two such co-operating cutting knives. The top line of the cutting edge is mostly located adjacent one surface of a metal plate which defines the body of the cutting knife and which has a certain thickness, so that a sloping chamfer extends between the two limiting surfaces and subtends an acute angle with the first mentioned limiting surface.

It is also known (U.S. Pat. No. 3,336,666 or U.K. patent No. 1,577,947) to provide, in connection with a stripping knife having a straight cutting edge, a positioning device for the conductor to be stripped. The positioning device is stationary relative to the cutting edge and is defined by a tapering, e.g. V-shaped or semicircular recess into which the conductor is forced.

The positioning devices known up to now have the disadvantage that they, in order to allow for the cutting knives to penetrate into the insulation cover to a given depth, only insufficiently retain the conductor, particularly at the instant of first contact between the conductor and the cutting edge.

OBJECT OF THE INVENTION

It an object of the present invention to provide a stripping device for conductors with circular cross-section, especially when they have a tough insulation, e.g. of polytetrafluoroethylene commercially known as Teflon (registered trademark), in which the conductor is securely guided and held in place by the positioning device already at the instant of its first contact with the cutting edge and until the instant in which the cutting edge has penetrated to a predetermined end position in the insulating cover.

SUMMARY OF THE INVENTION

This object and others which will become apparent hereinafter are attained with a stripping device, in particular for electrical conductors having a tough insulation and provided with a cutting means and with a positioning device for locating and retaining a treated conductor at a selected position relative to the cutting means, the stripping device comprising a pair of jaws movable toward and away from one another and an actuating means for at least one of the jaws to perform said movement; each said jaw extending in a longitudinal direction between a front end and a rear end and provided at said front end with an insulation cutting knife defining a part of said cutting means and having a front face, a rear face and a cutting edge, all extending transversely to said longitudinal direction, said positioning device comprising in a first jaw of said pair of jaws a first grasping member closely adjacent the rear face of the respective knife, and having a tapering recess defining said selected position; a carrier arm extending parallel to said longitudinal direction between a front end and a rear end and supporting at its said front end the first grasping member so as to urge it exclusively by resilient force in a maximally projecting position relative the adjacent cutting edge when the jaws are maximally moved apart; and in the second jaw of said pair of jaws, opposite said recess, a second grasping member cooperating with said first grasping member in forcing the treated conductor into said recess to retain it there by the effect of said resilient force opposing the retreat of the first grasping member from its maximally projecting position, so that a conductor is grasped and guided before the cutting edge of the respective cutting knife begins to penetrate into the insulation layer, and the first grasping member resiliently recedes until the cutting edge has reached its end position in the insulation layer. Thus, a conductor is grasped and guided before the cutting edge of the cutting knife begins to penetrate into the insulation layer, whereupon the grasping member resiliently yields until the cutting edge has reached its end position in the insulation layer.

Preferably, the second grasping member extends parallel to the rear face of the respective cutting knife, and is carried at the front end of a carrier arm extending parallel to said longitudinal direction between a front end and a rear end and resiliently urging the second grasping member in a maximally projecting position relative the adjacent cutting edge when the jaws are maximally moved apart.

The jaws, the respective grasping members and the respective carrier arms can be made in one piece of a plastics material.

A pair of guiding means embodied by inner blocks can be provided in one jaw frontwardly adjacent the cutting knife for rough centering or pre-centering of an inserted conductor in respect of the tapering recess, and another pair of guiding means embodied by outer blocks can be provided in the other jaw and encompass the first pair.

Advantageously the cutting edge of the cutting knife has an at least approximately semicircular notch which is centered relative to the tapering recess in the grasping member and a sloping chamfer in the region of the semicircular notch has a cylindrical or conical shape.

BRIEF DESCRIPTION OF THE DRAWING

The above and other objects will be better understood from the following description, reference being made to the accompanying drawing in which.

SPECIFIC DESCRIPTION

Figure 1:
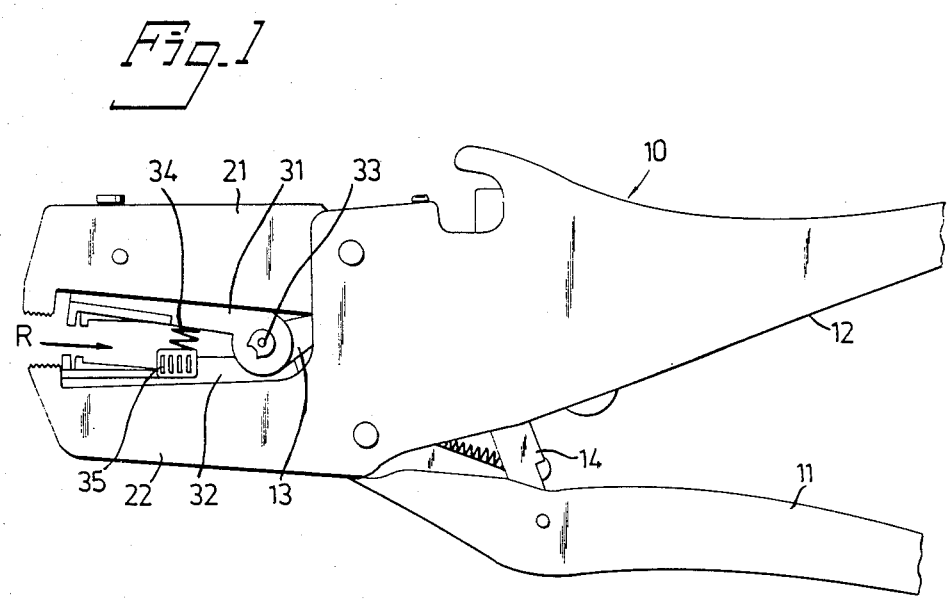
FIG. 1 is a side-elevational view of a pair of stripping pliers provided with a device according to the present invention.

According to FIG. 1, a pair of stripping pliers 10 comprises a pair of outer jaws 21, 22 which can be moved toward and away from one another by being connected to a pair of handles 11, 12. In this outer pair of jaws 21, 22 is mounted an inner pair of jaws 31, 32 in such manner that, when the handles 11, 12 are operated and the outer jaws 21, 22 are also closed and are closed the inner jaws are by a pulling mechanism which e.g. may comprise lever means 13 and 14, translatorily retracted in the direction of arrow R towards the handles 11, 12. The pulling mechanism can e.g. be either of the two embodiments described in U.S. Pat. Nos. 3,915,037 and 4,395,928 or German patents Nos. 2,402,187 and 3,134,311.

Figure 2:
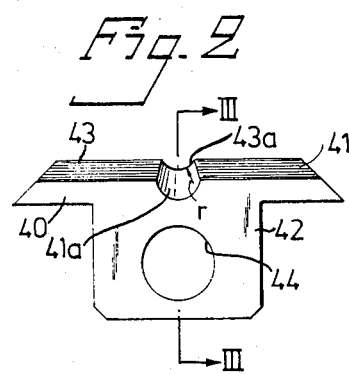
FIGS. 2 and 3 are a front view and a cross-sectional view along the plane III—III respectively of one of two identical cutting knives used in the pair of pliers of FIG. 1, both views being to a larger scale.
Figure 3:
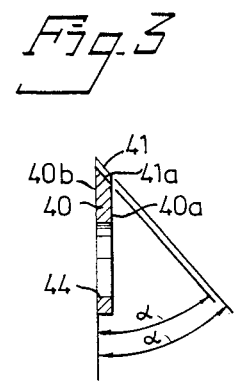

The inner jaws 31, 32 have front ends and rear ends and are at the rear ends pivotally connected one with another at the location 33 of their connection to the pulling mechanism and are continuously urged apart by a compression spring 34. The handles 11, 12, the levers 13, 14 and the outer jaws 21, 22 define an actuating means for the inner jaws 31, 32. A settable stop 35 for an inserted conductor is provided to adjust the length of the stripped insulation. According to the present invention, the inner jaws 31, 32 are made in a manner which is illustrated more in detail in FIGS. 4 to 7, whereas in FIGS. 2 and 3 a preferred embodiment of a cutting knife for the arrangement of FIGS. 4 to 7 is illustrated more in detail.

In both inner jaws 31, 32 there are at the respective front ends mounted identical cutting knives 40 which each have a forward or front limiting face 40a and rear face 40b. A chamfer 41, sloping at an angle α of approximately 30° relative to the rear limiting face 40b, connects the two limiting faces 40a, 40b along one of their margins, whereby a rectilinear cutting edge 43 is obtained at said rear limiting face 40b. In the central region of this rectilinear cutting edge 43 is an at least approximately semicircular notch 43a, having a radius r, arranged in the straight cutting edge 43. The chamfer 41 has, adjacent this recess, a cylindrical or conical portion 41a. The cutting knife 40 is further provided, opposite the cutting edge 43, with a centrally located projection 42 for inserting in a corresponding slot in the respective jaw, and an opening 44 is provided in said projection for accommodation of a fixing means (not shown in FIGS. 2 and 3) such as a bolt 34 (of FIG. 7) or the like.

The two inner jaws 31, 32 are constructed in a novel manner according to the present invention, as will be recognized from the study of FIGS. 4 to 7. A pair of projecting inner guiding means 36 is provided in the lower jaw 32 in front of the cutting knife 40, and a pair of projecting outer guiding means 37 is provided in the upper jaw 31. All said guiding means may be embodied by blocks, as shown in the drawing. The mutual spacing of the inner faces 36a of the inner guiding blocks 36 is such that conductors of all desired dimension may be readily introduced between the blocks 36, and the mutual spacement of the inner faces 37a of the outer guiding blocks 37 is such that the pair of the inner guiding blocks 36 is readily received within the pair of the outer guiding blocks 37 when the two jaws 31, 32 are closed. The front faces of the two pairs of guiding blocks define, when the jaws 31, 32 are at least partly closed, a wall means in which a centering opening, limited by said inner faces 36a of the inner guiding blocks 36, is provided and which serves for approximately or preliminary centering a treated conductor upon insertion into the pair of jaws.

The cutting knife 40 is with its projection 42 inserted into a corresponding slot 33 in the body of the respective jaw 31, 32 and is retained there by a bolt 34 (FIG. 7) or the like, passing therethrough. The cutting knives 40 lie with their front face 40a closely adjacent to the guiding blocks 36 and 37 respectively, and a grasping member 51, 52, of a positioning device 50 (FIG. 6) is resiliently mounted behind the rear surface 40b of the knives. Both said grasping members 51, 52 extend approximately parallel with the limiting faces 40a, 40b of the respective cutting knife 40 and each is carried by a support element 53, 54 attached at right angles thereto, i.e. extending in a lengthwise direction of the respective jaw. The support elements 53, 54 are embodied by carrier arms which are inherently resilient or resiliently anchored in the respective jaw 31, 32.

The entire jaw, inclusive of the parts 51 to 54, may be preferably made in one piece of an appropriate plastic (synthetic resin) material.

The outer free edge 51a of the grasping member 51 is rectilinear, while the outer free edge 52a of the other grasping member 52 is centrally provided with a tapering, viz. V-shaped recess 52b which is exactly centered in respect of the gap between the two inner guiding blocks 36 and relative to the semicircular notch 43a in the cutting edge of the adjacent cutting knife. The two semicircular notches 43a in the two cutting knives are of course also exactly centered one relative another.

Figure 5:
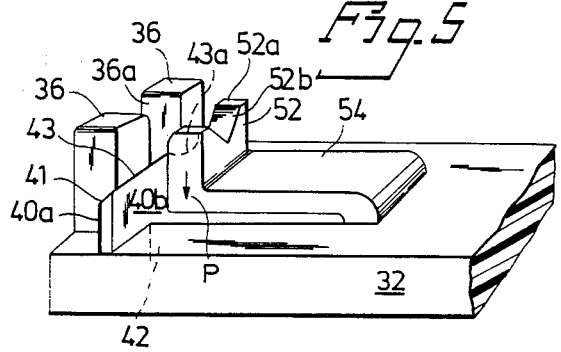
Figure 7:
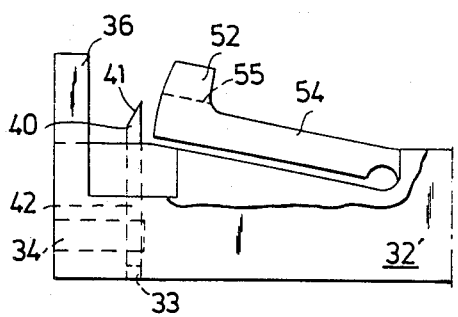
FIG. 7 is a side-elevational view, partly in section, of a somewhat modified jaw of FIG. 5.
Figure 6:
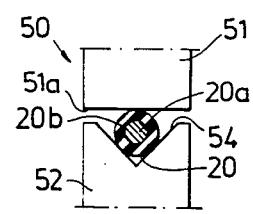
FIG. 6 is a front view of the rear part of the positioning device in the two jaws of FIGS. 4 and 5.

A conductor 20 (FIG. 6), having a conducting core 20a and an insulation layer 20b, is upon insertion into the pair of pliers 10 first roughly centered by the inner guiding blocks 36 of FIG. 5. These blocks prevent, together with the outer guiding blocks 37 of FIG. 4 the conductor to be inserted in another location along the cutting edge 43 than where the semicircular notch 43a and the tapering recess 52b are located. When the jaws of the two pairs of jaws 21, 22 and 31, 32 then approach one to another upon operation of the handles 11, 12, the rectilinear edge 51a of the grasping member 51 which at rest is held by the inherently resilient carrier arm 53 held in a maximally projecting position relative the respective cutting edge 43a, forces the conductor 20 (FIG. 6) into the V-shaped recess 54 in the member 52 which is also, at rest, held by the inherently resilient carrier arm 54 held in a maximally projecting position relative the respective cutting edge, as best seen in FIG. 7. This forcing or pressing-in occurs at the latest when the insulation layer 20b of the conductor 20 for the first time comes into contact with the cutting edge 43a, but in general, due to the said maximally projecting position of the resiliently mounted members 51, 52, earlier than that.

When the jaws 31, 32 are further approximated one to another, the two resilient carrier arms 53, 54 yield and the grasping members 51, 52 withdraw in the sense of the arrows P as far as necessary, without releasing the seized conductor 20 which continues to be retained by the members 51, 52 until the jaws in the two pairs of jaws 21, 22, 31, 32 again separate one from another, which in the pair of pliers of the present example occurs at the end of the rearward movement of the inner pair of jaws 31, 32 in the sense of the arrow R, actuated by the pulling mechanism 13, 14.

As an additional advantage, in a pair of pliers with rearward movement of the jaws, the portion of the insulation 20a which has been severed by the cutting knives 40, is during this rearward movement of the inner jaws 31, 32 reliably stripped off by the closed and retracting grasping members 51, 52 of the positioning device. In order to securely prevent damage to the conducting core 20a by the cutting portions 43a, these portions may be so dimensioned and arranged that a negligible layer of the insulation 20, closely adjacent the conductive core 20a will remain uncut in the end position of the jaws, and will be, squeezed and carried rearwardly by the grasping members 51, 52, torn off as the inner pair of jaws is moved rearward.

Figure 8:
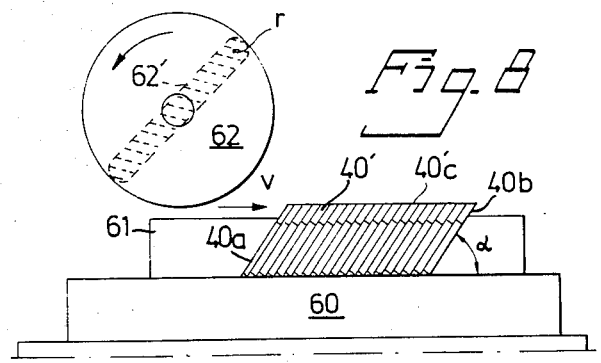
FIG. 8 illustrates in a side view the process of machining a plurality of cutting knives of FIGS. 2 and 3 in one single operation.
Figure 4:
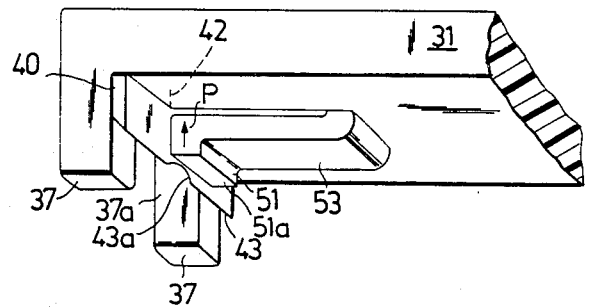
FIGS. 4 and 5 are perspective views, on a larger scale, of an upper inner jaw and a lower inner jaw of the pair of pliers of FIG. 1.

A particularly advantageous method of producing the cutting knives 40 is shown in FIG. 8. A plurality of blanks 40' are fixed in a clamping fixture 61 on the working table 60 of a metal removing machine such as a grinding or milling machine, and in such a manner that they all subtend the above mentioned angle α with the plane of the working table 60 or, more correctly, with the direction of feed V of a working tool, which direction is parallel to the table.

The chamfers 41, and thereby also the rectilinear cutting edges 43, can be produced in a first operation by a tool, such as rotating miller or grinding wheel with a cylindrical working surface, being moved over the free upper edges of the blanks 40' parallel with the plane of the working table.

Thereupon, in a second operation illustrated in FIG. 8, a tool 62 such as rotating miller or grinding wheel having a profile 62' which on the periphery has the same shape (radius r) as the recess 43a in the cutting edge 43, is moved along the upper ends of the blanks, but somewhat lower than the previous cylindrical tool. The blanks 40', which by the cylindrical tool already have been provided with cutting edges 40, are now provided with the semicircular portions 41a and 43a.

Other possible modifications within the scope of the present invention include, e.g.:

Only one of the members 51, 52 is resiliently mounted.

Instead of the V-shaped recess 54 some other tapering recess, e.g. a semicircular one, is provided.

Both members 51, 52 are provided with a tapering recess.

The outer pair, or both pairs of guiding blocks may be omitted.

The cutting knives 40 may be made and mounted without the central projection 42.

The rectilinear part of the cutting edges 43 on both sides of the notch 43a may be replaced by a noncutting, blunt edge.

The application of the present invention is of course by no means restricted to the type of pliers with two pairs of jaws and/or to the treatment of conductors with tough insulation layers such as layers of Teflon (registered trademark). It will be also appreciated that the positioning device according to the invention also can be used knives having uninterrupted rectilinear cutting edges, or with such cutting knife means which comprise a plurality of separate blades, as shown e.g. in the U.S. Pat. No. 4,197,768.

We claim:

1. A stripping device, in particular for electrical conductors having a tough insulation and provided with a cutting means and with a positioning device for locating and retaining a treated conductor at a selected position relative to the cutting means, the stripping device comprising a pair of jaws movable toward and away from one another and an actuating means for at least one of the jaws to perform said movement; each said jaw extending in a longitudinal direction between a front end and a rear end and provided at said front end with an insulation cutting knife defining a part of said cutting means and having a front face, a rear face and a cutting edge, all extending transversely to said longitudinal direction, said positioning device comprising in a first jaw of said pair of jaws a first grasping member closely adjacent the rear face of the respective knife, and having a tapering recess defining said selected position; a resilient carrier arm extending parallel to said longitudinal direction between a front end and a rear end and supporting at its said front end the first grasping member so as to urge it exclusively by resilient force in a maximally projecting position relative the adjacent cutting edge when the jaws are maximally moved apart; said rear end being fixedly anchored in the first jaw and in the second jaw of said pair of jaws, opposite said recess, a second grasping member extends parallel to the rear face of the respective cutting knife, and is carried at the front end of a second resilient carrier arm extending parallel to said longitudinal direction between a front and a rear end and resiliently urging the second grasping member in a maximally projecting position relative the adjacent cutting edge when the jaws are maximally moved apart, said rear end of the second resilient carrier arm being fixedly anchored in the second jaw, said second grasping member cooperating with said first grasping member in forcing the treated conductor into said recess to retain it there by the effect of said resilient force opposing the retreat of the first grasping member from its maximally projecting position, so that a conductor is grasped and guided before the cutting edge of the respective cutting knife begins to penetrate into the insulation layer, the first grasping member resiliently recedes until the cutting edge has reached its end position in the insulation layer, and an outer pair of jaws embodying a part of said actuating means and wherein said pair of jaws is mounted in the outer pair of jaws for translatorial rearward movement relative thereto in the sense of said longitudinal direction when actuated by said actuating means so as to tear off and move rearward a severed portion of the insulation, said outer pair of jaws including a means for gripping the conductor during said rearward movement of said pair of jaws.

2. The device of claim 1, wherein in one of said jaws is rigidly mounted a pair of guiding or pre-centering blocks frontwardly of the front face of the cutting knife, and one block is separated from the other by a gap registering with said recess and defining a pre-centering opening.

3. The device of claim 2, wherein in the other jaw is rigidly mounted a pair of outer guiding blocks frontwardly of the front face of the respective cutting knife and one block is separated from the other by a gap into which said pair of pre-centering or inner guiding blocks may be received to define therewith a wall with said pre-centering opening.

4. The device of claim 1, wherein also said second grasping member has a straight engagement edge opposite said recess in the first grasping member.

5. The device of claim 1, wherein the first jaw, the respective carrier arm and the first grasping member are made of one piece of a plastic material.

6. The device of claim 1, wherein the second jaw, the respective carrier arm and the second grasping member are made of one piece of a plastic material.

7. The device of claim 2, wherein the first jaw, the respective carrier arm, the first grasping member and the pair of pre-centering blocks are made of one piece of plastic material.

8. The device of claim 1, wherein the second jaw is provided with a pair of blocks frontwardly of the front face of the respective cutting knife, one block being separated from the other by a gap into which a pair of pre-centering blocks on the other jaw may be comprised, and wherein said second jaw, said pair of blocks on the second jaw, said second grasping member and the respective carrier arm are made of one piece of plastic material.

9. The device of claim 1, wherein the cutting edge of each cutting knife is an at least approximately semicircular notch provided in alignment with said recess.

10. The device of claim 9, wherein the cutting knife has a sloping, at least approximately conical chamfer adjacent said semicircular notch.

11. The device of claim 1, wherein said cutting knife has a centrally located projection opposite the cutting edge and the jaw is provided with a slot for receiving this projection.

12. The device of claim 11, wherein an opening is provided in said projection for a fixing means.

13. The device of claim 3, wherein the cutting edge is provided with a semicircular notch and at least one grasping member is provided with a tapering recess registering with the notch.

* * * * *